(12) United States Patent
Matkowsky

(10) Patent No.: US 8,538,842 B2
(45) Date of Patent: Sep. 17, 2013

(54) SYSTEM AND METHOD FOR FINANCIAL ANALYSIS AND BRAND INDEX IN BRAND VALUATION

(75) Inventor: Jonathan Matkowsky, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 765 days.

(21) Appl. No.: 12/703,124

(22) Filed: Feb. 9, 2010

(65) Prior Publication Data

US 2011/0196715 A1    Aug. 11, 2011

(51) Int. Cl.
*G06Q 40/00* (2012.01)
(52) U.S. Cl.
USPC .............................................. 705/35; 705/40
(58) Field of Classification Search
USPC .......................................................... 705/35
See application file for complete search history.

(56) References Cited

U.S. PATENT DOCUMENTS

2004/0210479 A1* 10/2004 Perkowski et al. ............. 705/14
2009/0254545 A1* 10/2009 Fisken ............................ 707/5

OTHER PUBLICATIONS

PR Newswire; Bulk Register Newswire launches online brand monitoring; Jan. 21, 2003; 21/3,K/9 (Item 4 from file: 613).*

Thomas Reuters; Computer implemented value score calculating method involves identifying calculating method, involves identifying technique for increasing three sub-scores, and providing domain name score; 13AN,Az,T1/4 (Item 4 from file : 350).*

Thomas Reuters; Sending method for enhanced mail vial email involves inserting add on programming code corresponding to signature selection code into email to create enhanced email and to create enhanced email based on intended email address; 13AN,Az,TI/4 (Item 3 from file: 350).*

* cited by examiner

*Primary Examiner* — Olabode Akintola
*Assistant Examiner* — Michael Cranford
(74) *Attorney, Agent, or Firm* — James J. DeCarlo; Greenberg Traurig, LLP

(57) ABSTRACT

A brand name is used to generate a domain name portfolio comprising at least one brand domain name comprising the brand name and a top-level domain name, and at least one qualified brand domain name comprising the brand name, at least one qualifying term, and a top level domain name. Network traffic is tracked for each of the domain names in the domain name portfolio over an analysis period. A role of brand index is determined, wherein the role of brand index is determined using the ratio of network traffic for the brand domain name to a total of the network traffic for all domain names in the domain name portfolio. Additionally, revenue generated by websites linked to each of the domain names in the domain name portfolio is tracked over the analysis period. Brand earnings are then calculated the revenue generated by websites.

27 Claims, 4 Drawing Sheets

SYSTEM AND METHOD FOR FINANCIAL ANALYSIS AND BRAND INDEX IN BRAND VALUATION

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for valuing brands using financial analysis and brand index valuation techniques, more particularly, to systems and methods for using traffic and income relating to portfolios of domain names in financial analysis and brand index valuation techniques.

BACKGROUND OF THE INVENTION

Brands have the potential to create demand and sustainable value for their businesses. More than 50 percent of the value of many well-known businesses is in intangible assets, namely the business' brands. Oftentimes, a brand is an organization's most valuable asset, and it must be properly managed to remain productive. Properly managing a brand, however, requires an understanding of the brand's value in order to make appropriate marketing and investment decisions relating to the brand. Also, in deciding whether to sell a brand and at what price, a brand holder will need to valuate the brand.

SUMMARY OF THE INVENTION

In one embodiment, the invention is a method. A brand name comprising at least one token is received, over a network. A plurality of domain names is generated, using at least one computing device. The plurality of domain names comprises at least one brand domain name comprising the brand name and a top-level domain name, and at least one qualified brand domain name comprising the brand name, at least one qualifying term, and a top-level domain name. A domain name portfolio is created using the computing device. Each of the plurality of domain names is checked using the WHOIS protocol to determine if the respective domain name is registered and if so, by whom. Domain names that are not registered and domain names that are registered to the brand owner are inserted into the domain name portfolio. Each of the domain names in the domain name portfolio that is not yet registered is then registered with a domain registrar in the name of the brand holder or a licensee. Each of the domain names in the domain name portfolio are parked with a domain name parking service. Network traffic is tracked, using the computing device, for each of the domain names in the domain name portfolio over an analysis period. A role of brand index is determined, using the computing device, wherein the role of brand index is determined using the ratio of network traffic for the brand domain name to a total of the network traffic for all domain names in the domain name portfolio.

In one embodiment, the method includes additional steps. Revenue generated by websites linked to each of the domain names in the domain name portfolio is tracked over the analysis period. Brand earnings are then calculated, using the computing device, using the revenue generated by websites linked to each of the domain names in the domain name portfolio over the analysis period.

In another embodiment, the invention is a system comprising a group of modules. Each module comprises one or more processors programmed to execute software code retrieved from a computer readable storage medium storing software for various functions as described below.

In one embodiment, the system comprises: a brand name receiving module for receiving, over a network, brand names, wherein each brand name comprises at least one token; a domain name generation module for generating, for each brand name received by the brand name receiving module, a plurality of domain names, wherein the plurality of domain names comprises at least one brand domain name comprising the respective brand name and a top level domain name, and wherein the respective plurality of domain names further comprises at least one qualified brand domain name comprising the respective brand name, at least one qualifying term, and the top level domain name; a domain name portfolio creation module for creating, for each plurality of domain names generated by the domain name generation module, a domain name portfolio, wherein each of the plurality of domain names is checked using the WHOIS protocol to determine if the respective domain name is registered, wherein domain names that are not registered and domain names that are registered to an owner of the respective brand are inserted into the domain name portfolio; a domain name registration module for registering each of the domain names in the each of the domain name portfolios created by the domain name portfolio creation module that is not registered to the respective brand owner, whereby each of the domain names in the respective domain name portfolio is registered to the respective brand owner; a domain name parking module comprising for parking each of the domain names in each of the domain name portfolios created by the domain name portfolio creation module with a domain name parking service; a domain name traffic tracking module for tracking network traffic, for each of the domain names in the each of the domain name portfolios created by the domain name portfolio creation module over an analysis period; and a role of brand index determination module for determining a first role of brand index for each of the domain name portfolios created by the domain name portfolio creation module over an analysis period, wherein the respective role of brand index is determined using the ratio of network traffic for the respective brand domain name to a total of the network traffic for all domain names in the respective domain name portfolio.

In one embodiment, the system additionally comprises a domain name revenue tracking module for tracking, for each of the domain name portfolios created by the domain name portfolio creation module, revenue generated by websites linked to each of the respective domain names in the respective domain name portfolios over the analysis period; and a brand earnings determination module for calculating, for each of the domain name portfolios tracked by the domain name revenue tracking module, brand earnings using the revenue generated by websites linked to each of the respective domain names in the respective domain name portfolio over the analysis period.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
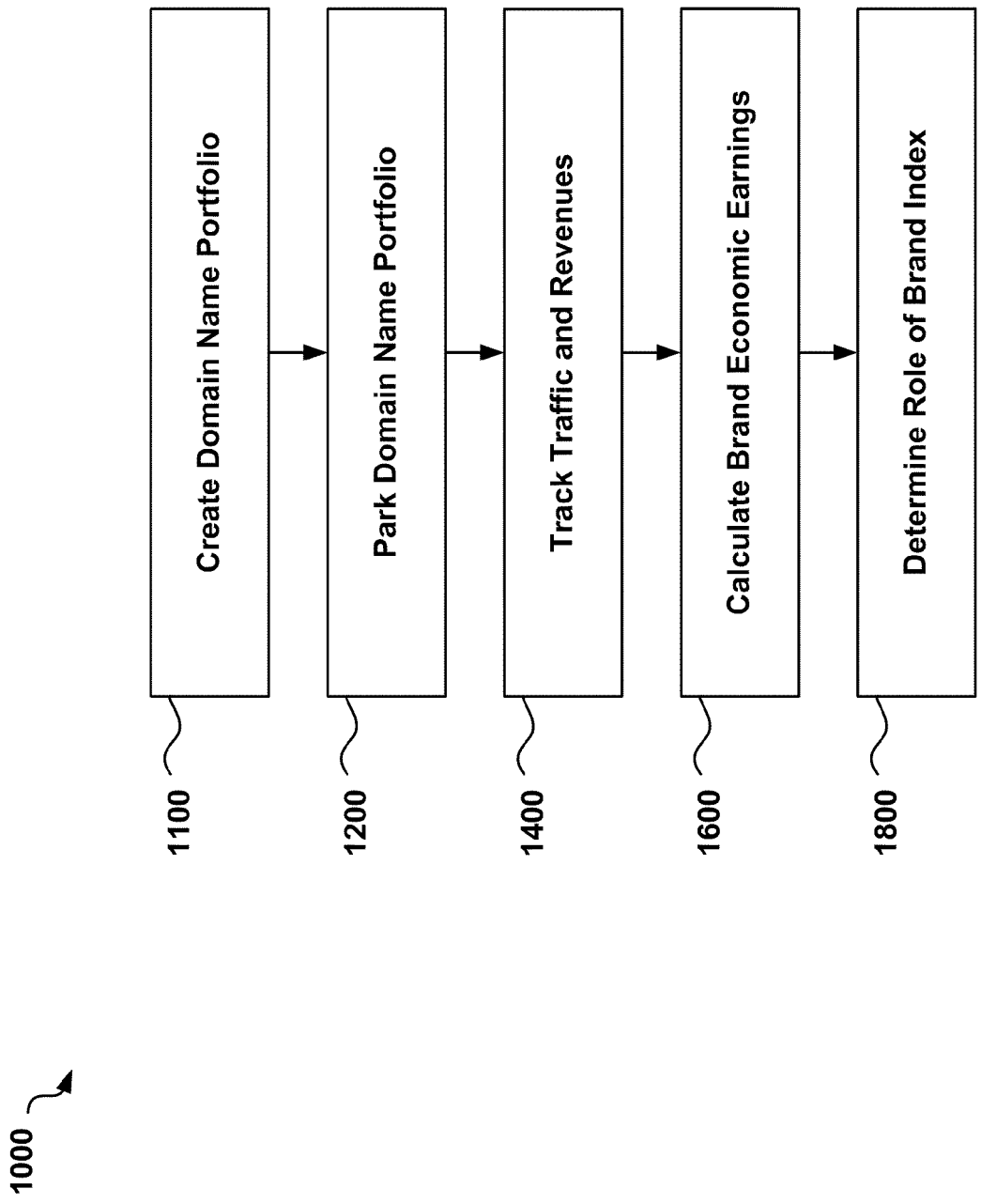
FIG. 1 illustrates a conceptual view of how data derived from domain name portfolios relating to individual brands could be adapted to a brand analysis and valuation framework.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may grouped into an engine or an application.

For the purposes of this disclosure the term "end user" or "user" should be understood to refer to a consumer of data supplied by a data provider or services provided by a service provider. By way of example, and not limitation, the term "end user" can refer to a person who receives data provided by a data provider over the Internet in a browser session, or can refer to an automated software application which receives the data and stores or processes the data. By way of example, and not limitation, the term "end user" can additionally or alternatively refer to a person who uses a service provided by a service provider over the Internet in a browser session, such as, for example, a recommendation system.

For the purposes of this disclosure the term "browser" or "web browser" should be understood to refer to any function of a computing device for retrieving, presenting, and traversing information resources over a network, such as the Internet. Information resources used by browsers are identified by a Uniform Resource Identifier (URI) and can be a web pages, images, video, or other any other type of digital content. Hyperlinks present in resources enable users to navigate their browsers to related resources. Browsers are typically implemented as one or modules residing on end-user computing devices having data transmission and display capabilities, such as, without limitation, desktop and laptop computers, PDAs and mobile phones.

The present disclosure is directed to various embodiments for automating the determination of the value and strength of brands using data derived from traffic and earnings of domain name portfolios relating to individual brands. In at least one embodiment, brand earnings and strength are determined using a framework based on concepts for brand analysis and valuation developed by Interbrand, Inc.

The basic framework for brand analysis and valuation developed by Interbrand, Inc. includes three basic components: (1) financial analysis aimed at calculating a brand's economic earnings; (2) calculating a Role of Brand Index, which is an index of the role of the brand in sales of the branded product; and (3) determining a Brand Strength Score for the brand, the score being used to assess the riskiness of forecasted brand earnings.

In the financial analysis component of the methodology, current and future earnings specifically attributable to branded products are forecast. Operating costs are then subtracted from revenue to calculate branded operating profit. A charge is then applied to the branded profit for capital employed, giving the brand's economic earnings. In one embodiment, financial analyses can be based on publicly available data culled from a range of analysts' reports to build a consensus estimate for financial reporting. In uncertain economic times, however, analysts may find it difficult to forecast earnings accurately, and brand valuation based on such forecasts may be suspect.

The Role of Brand Index is a measure of how much of the customer demand was dependent on a brand at the point of purchase. The Index is applied to the economic earnings to arrive at Branded Earnings to isolate a brand's contribution to the earnings. In its various brand studies, such as its annual Best Global Brands report, Interbrand, Inc. uses industry benchmark analysis for the Role of Brand Index derived from Interbrand's database of more than 5,000 prior valuations conducted over the course of 20 years and in-house market research to establish individual brand scores against its industry benchmarks.

The Brand Strength Score is a measure of the brand's ability to drive choice and secure ongoing customer demand. The Brand Strength Score can be used to assess the riskiness of forecast Brand Earnings. The Brand Strength Score can be translated into a discount rate which, applied to Brand Earnings, can be used to calculate the net present value of a brand. Brand Strength can be determined, in one embodiment, by comparing the brand against common factors of brand strength in its marketplace.

FIG. 1 illustrates a conceptual view 1000 of how data derived from domain name portfolios relating to individual brands could be adapted to a brand analysis and valuation framework, such as, for example, a brand analysis and valuation framework based on concepts for brand valuation developed by Interbrand, Inc.

First, a domain name portfolio is created 1100. In one embodiment, the portfolio includes domain names that are comprised of the brand name only, and the brand name together with qualifying terms, such as generic or descriptive wording of the services rendered, or products offered in connection with the brand name. For example, assume there is a chain of spas branded as RelaxNow. The spas offer a variety of products such as shampoos and skin care products, and a variety of services such as manicures and massages. A domain portfolio for RelaxNow could include:

www.relaxnow.com www.relaxnowspa.com, www.relaxnowspas.com and/or www.relaxnow-spas.com www.relaxnowmassage.com and/or www.relaxnow-massage.com www.relaxnowskin.com, and or www.relaxnow-skincare.com www.relaxnowshampoo.com and/or www.relaxnowhaircare.com The basic assumption behind developing such a domain portfolio is that users searching on the Internet for a brand commonly enter the brand name or the brand name and one or more descriptive words for products or services into the address bar of a web browser application. Traffic associated with such domain names can be used as a metric for measuring interest in a brand, at least among Internet users.

Organizations that aggressively market online may already have a domain name portfolio. In the case of companies with a limited online presence, domain names could be selected and then registered by or on behalf of such companies.

The domain portfolio is then parked 1200 with a domain name parking service such that the number of visitors to each of the domain names can be measured over time. If an organization has a significant online presence, the organization may already have domain names in their respective domain name portfolios parked or otherwise directed to active websites. In such cases, the organization may be actively monitoring traffic and revenue attributable to specific domain names. In the case of organizations with a limited or nonexistent online presence, the domain portfolio can be parked with a domain parking company that will track the number of visitors to the domain names in the portfolio.

In this context, domain parking refers to an advertising practice known as parked domain monetization used to monetize type-in traffic visiting a parked or minimally developed domain name. The domain name will commonly resolve to a web page containing advertising listings and links. The links will typically be targeted to the predicted interests of the visitor. Usually the domain holder is paid based on how many links have been visited (e.g. pay per click) and/or on revenue generated as a result of such visits (e.g. product sales). The keywords for any given domain name provide clues as to the intent of the visitor before arriving.

The traffic and revenue associated with the domain name portfolio is then tracked 1400. The data collected by tracking earnings and visitors over several months can be used to calculate current traffic and revenue and forecast future traffic and revenue. All of the current and forecast and earnings is specifically attributable to the brand because the brand is included in the domain names in the domain name portfolio. Operating costs can be subtracted from the revenue to calculate branded operating profit, and a charge can be applied to the branded profit for capital employed, giving the brand's economic earnings 1600.

A role of brand index can then be determined 1800 using traffic statistics and/or revenue generated by domains comprised of the brand name with generic or descriptive wording and the traffic and revenue on the domains comprised of the brand name without generic or descriptive wording. Such a role of brand index indicates how much customer demand was dependent solely on the brand at the point of purchase.

Figure 2:
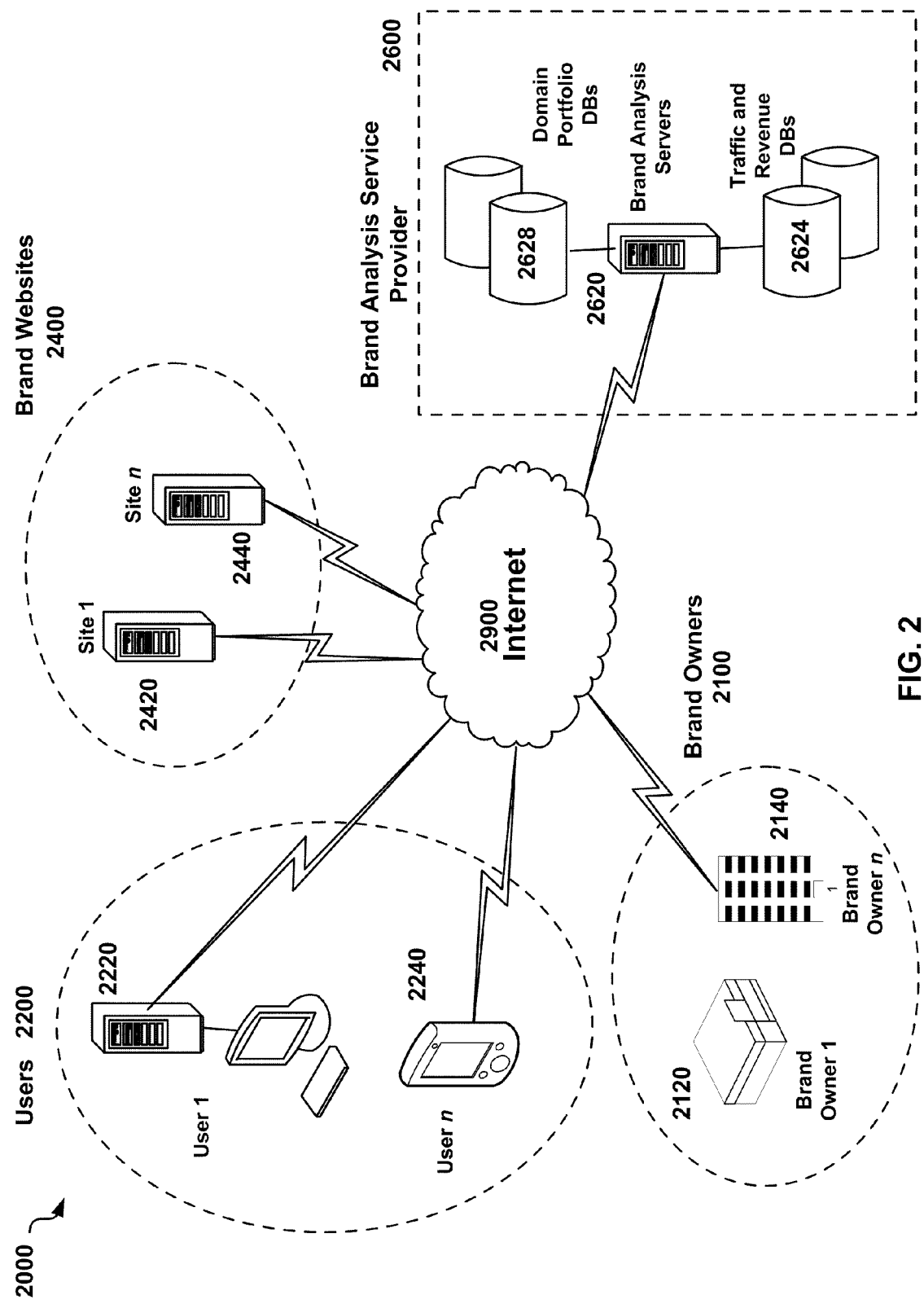
FIG. 2 illustrates one embodiment of a system 2000 capable of supporting at least one embodiment of a brand analysis and valuation framework such as that illustrated in FIG. 1.

FIG. 2 illustrates one embodiment of a system 2000 capable of supporting at least one embodiment of a brand analysis and valuation framework such that illustrated in FIG. 1.

A number of brand owners 2100 each own one or more brands relating to products and/or services. Such brands have at least one brand name (e.g. COCA COLA, COKE, etc.). Brand owners, such as brand owner n 2140, may be connected to the Internet and may maintain one or more brand websites 2400. Such brand websites typically contain various types of information about products and/or services offered under the brand, and can additionally include mechanisms for purchasing such products and/or services. Such websites 2400 could also include information about related products and/or services, and may include click through advertisements for such products and/or services. A brand owner's website may be hosted by the brand owner at facilities owned and maintained by the brand owner, or may be hosted and maintained by a third-party service provider.

Some brand owners, such as brand owner 1 2120, may not be connected to the Internet and may not host or maintain a corporate website. In such case, websites 2400 or generic landing pages linked by domain names related to a brand owner's brand could be maintained on the brand owner's behalf by a third-party service provider, such as a domain parking service. Brand owners, such as brand owner n 2140, that host and maintain one or more brand websites 2400 may also choose to use the services of a domain parking service for domain names relating to brands that do not link to the brand owner's primary brand websites.

A number of users 2200 access the Internet 2900 using various network connectable devices such as desktop PCs 2220 or PDAs 2240. Each of the devices 2220 and 2240 support at least one web browser. Periodically, each of the users 2200 browse brand websites 2400 using web browsers implemented on their respective devices. Users 2200 typically reach such brand websites by either typing a domain name into the address bar of a browser, or through links provided by a web search service, such as Yahoo! or Google. Each of the websites 2400 can provide facilities for tracking traffic (e.g. the number of visitors) for the website. Additionally, each of the websites 2400 can additionally provide facilities for tracking revenue generated by the websites through direct sales or click-through ad revenue. Alternatively, or additionally, traffic on, and revenue generated by a website can be tracked by one or more third-party services (not shown).

A brand analysis service provider 2600 provides services for analyzing brand performance using data relating to traffic on, and revenue, generated by brand websites 2400. Such services can include automated creation of domain portfolios by processes implemented on brand analysis servers 2620 and storage of data relating to portfolios in domain portfolio databases 2628. Such services can further include automated retrieval of traffic and revenue data relating to individual websites 2400 and storage of such data in domain traffic and revenue databases 2624. Such services can further include automated brand financial analysis and role of brand index determination by processes implemented on brand analysis servers 2620 using data stored in the domain portfolio databases 2628 and the traffic and revenue databases 2624.

Figure 3:
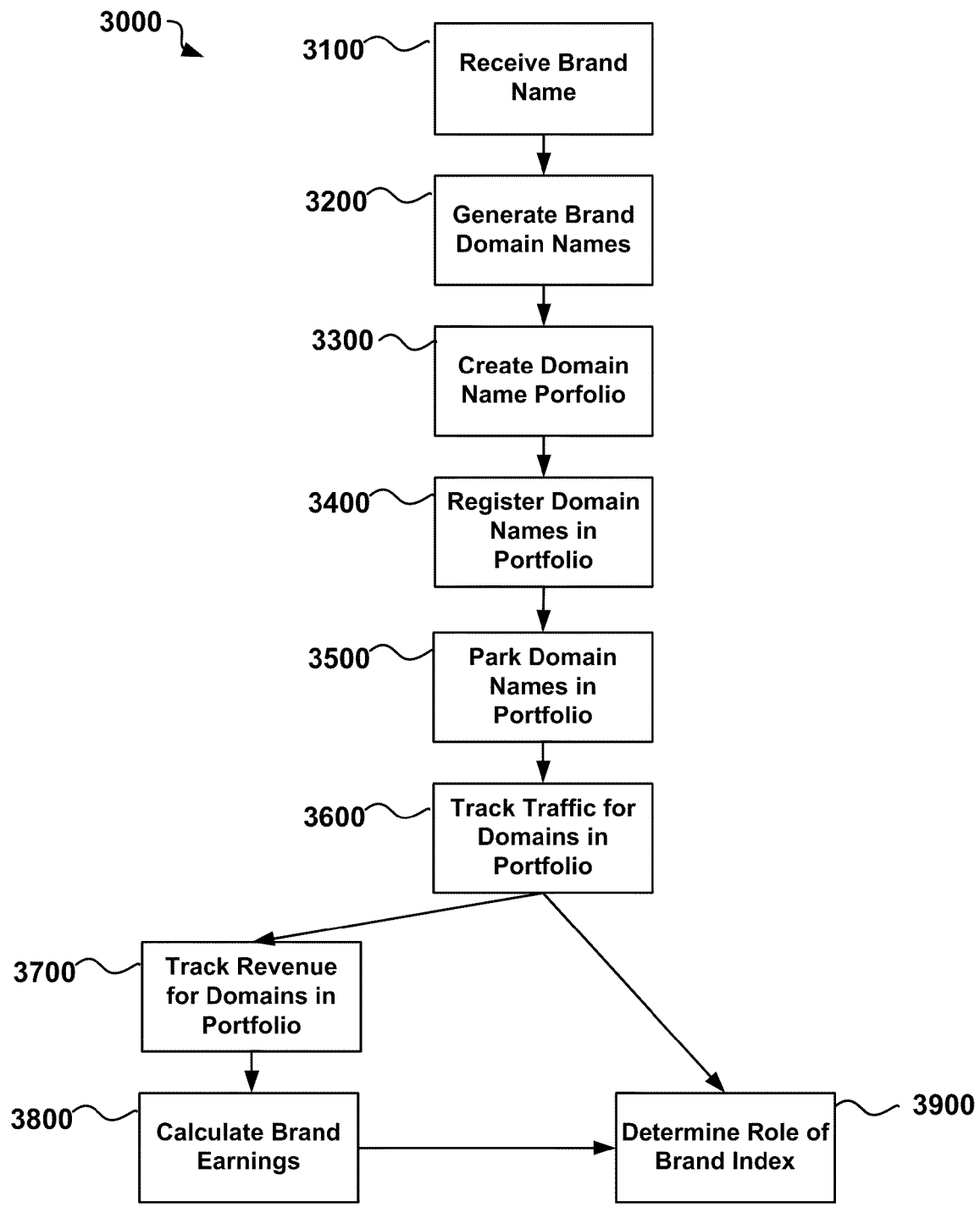
FIG. 3 illustrates one embodiment of a process 3000 for implementing at least one embodiment of a brand analysis and valuation framework such as that illustrated in FIG. 1.

FIG. 3 illustrates one embodiment of a process 3000 for implementing at least one embodiment of a brand analysis and valuation framework such as that illustrated in FIG. 1.

A brand name is received, over a network 3100. The brand name can comprise one or more tokens, each of which is a letter, symbol or word. The brand name could be transmitted by a brand owner to a server directly to a server maintained by a brand analysis service provider, or alternatively, could be communicated to a brand analysis service provider by, for example, regular mail, email, or voice communications. The brand name could then be input to a brand analysis process though a user interface provided by one or modules implementing the process.

A plurality of domain names relating to the brand name is then generated 3200 using a computing device. In one embodiment, the plurality of domain names includes domain names that are comprised of the brand name only, and domains that comprise the brand name together with qualifying terms, such as generic or descriptive terms describing or categorizing the services rendered, or products offered. Such terms could include one or more words. Such words could include nouns that name a general product type or service type to which the brand name belongs (e.g. Apple computers, Gucci loafers). Such words could include adjectives that describe the qualities or properties of a product or service, (e.g. black Gucci loafers, fast apple computers).

Brand names and generic and/or descriptive terms could be concatenated together, or could be separated by other characters, such as "—". Where a brand name contains a special character not suitable for a domain name, the character could be translated to its nearest text equivalent (e.g. @Work becomes at-work).

In one embodiment, generic and descriptive terms relating to a brand words are received the network from, for example, the brand owner or an employee of the brand service provider. Oftentimes, the brand owner is in the best position to determine categories and qualities that best describe their product. The generic and descriptive terms could be transmitted by a brand owner directly to a server maintained by a brand analysis service provider, or alternatively, could be communicated to a brand analysis service provider by, for example, regular mail, email, or voice communications. The generic and descriptive terms could then be input to a brand analysis process though a user interface provided by one or modules implementing the process.

Alternatively, or additionally, generic and descriptive terms relating to a brand words could be selected by an automated process. In one embodiment, the brand could be used to submit a query to an Internet search service, such as those offered by Yahoo! and Google. The search result could include various types of information that could be of use. The titles and short descriptions provided in the search result could include terms closely associated with the brand name (e.g. within the same sentence or title). For example, a search on "Sprite" shows that the brand is associated with the terms "soft drink", "lemon-lime" and "caffeine-free". The search result could also include complete domain names that contain the brand name (e.g. a search on "yahoo" yields "www.yahoo.com", "mail.yahoo.com", "finance.yahoo.com", "news.yahoo.com" and so forth). Such domain names may or may not be owned by the brand owner. Such domain names could be automatically included in the domain name portfolio, and could additionally be parsed to select out terms included in the domain name.

In one embodiment, brand market information sufficient to determine the appropriate top-level domain names (TLD) to assign to generated domain names is received over the network from, for example, the brand owner or an employee of the brand service provider. Oftentimes, the brand owner is in the best position to determine markets that are of the greatest interest to the brand holder. Such information could reveal that the product has a global, regional (e.g. Europe) or national (e.g. France) market. Each such market would imply various TLDs. For example, a U.S. market could generate *.com, *.biz and *.us domain names, whereas a French market could generate *.fr and *.eu domain names. The market information could be transmitted by a brand owner to a server directly to a server maintained by a brand analysis service provider, or alternatively, could be communicated to a brand analysis service provider by, for example, regular mail, email, or voice communications. The brand market information could then be input to a brand analysis process though a user interface provided by one or modules implementing the process.

Alternatively, or additionally, TLDs for generated domain names could be selected by an automated process. In one embodiment, the brand could be used to submit a query to an Internet search service, such as those offered by Yahoo! and Google. The TLDs associated with domain names in the search result could be extracted and analyzed to determine, for example, the TLDs most frequently associated with websites referencing the brand.

In one embodiment, the generated domain names can then be displayed on a user interface tangibly displayed on a display device. The portfolio can be displayed to the brand owner or an administrator employed by the brand analysis service provider. In one embodiment, the user interface allows the interface to add or delete domain names from the portfolio.

A domain name portfolio is then created 3300 from the generated domain names using computing device. Each of the generated domain names is checked using the WHOIS protocol to determine if the respective domain name is already registered. Those domain names that are available for registration and domain names that are registered to the brand owner are selected for inclusion in a domain name portfolio for the brand. Domain names that are registered to a third party can be reported to the brand owner. Such domain names may be of interest as, for example, they may identify cases of cybersquatting.

Domain names that are available for registration are then automatically registered 3400 on behalf of the brand owner through a domain registrar. In one embodiment, registration forms required for domain name registration can be automatically filled with the required information from information included in a brand owner profile stored on a computer-readable medium accessible to brand analysis service servers. Such a profile could be generated, for example, when a brand owner registers with a brand analysis service provider.

Domain names in the domain name portfolio that are not currently associated with an active website are then parked 3500 with a domain name parking service. In one embodiment, domain names associated with an active website remain associated with that site. In one embodiment, domain names are hosted or re-directed to a domain name parking service. The domain name parking service could be a third party service, could be supplied by the brand analysis service provider, or could be implemented by the brand owner on servers controlled by the brand owner. In one embodiment, parked domain names are linked to generic landing pages that can include automatically generated content relating to related products and services, and can further include click-through advertisements linked to an advertising service such as the Yahoo! Advertising service or the Google AdSense service.

Traffic on 3600 and/or revenue generated by 3700 the websites included in the domain name portfolio are then tracked over an analysis period. Data relating to traffic 3600 could include, for example, the number of visitors to websites by day, the number of unique visitors to websites by day, or the number of visitors to a websites that click through on a link or advertisement on the website. Data relating to traffic on websites could be obtained, for example, from a third party service provider, could be tracked by a process associated with the website (e.g. a web control embedded in a webpage), or could be tracked by the brand analysis service provider. In one embodiment, all domain names in a domain name portfolio could be transferred to a name server under the control of the brand analysis service provider to facilitate gathering traffic data.

Data relating to revenue 3700 generated by websites could include revenue generated using any technique for monetization of website traffic known in the art. For example, data relating to revenue generated by websites could include online sales of products associated with the brand name facilitated by the website (e.g. a retailer's online store). Data relating to revenue generated by websites could also include pay-per-click revenue generated by advertisements and links to third-party websites that are displayed on the website. Such data could be retrieved, for example, from a third party service provider (such as Yahoo! Advertising or Google AdSense), or could be tracked by a process associated with the website (e.g. a server-based process that tracks online sales).

Brand earnings are then calculated 3800 using the data relating to revenue generated by websites in the website portfolio over the analysis period. Future earnings could additionally be forecast using any forecasting technique known in the art. It is presumed all of the current and forecast and earnings is specifically attributable to the brand because the brand is included in the domain names in the domain name portfolio. Operating costs can be subtracted from the revenue to calculate branded operating profit. Operating costs could include any expenditures (whether human or technological) to host and maintain the websites associated with the domain name portfolio. A charge could additional be applied to the branded profit for capital employed in creating, hosting and maintaining the websites in order to calculate the brand's economic earnings. The capital that is employed in creating and hosting the websites could include the amount spent to initially create the websites or hardware, such as servers, dedicated to hosting the websites. Whether any given expenditure relating to the websites in the domain name portfolio is an expense or a capital expenditure could be determined, in one embodiment, by the brand owner's accounting conventions.

Of course such earnings may be a relatively limited measure of total brand earnings where products or services are sold through channels in addition to the Internet, such as, for example, in brick and mortar stores. Rather, such earnings reflect the capacity of the brand to generate online revenues (which could be total brand revenues, for example, in the case of an online retailer).

A role of brand index is then determined 3900 using data relating to traffic on and/or data relating to revenue generated by domains in the domain name portfolio. In one embodiment, the role of brand index is determined using the ratio of traffic and/or revenue generated by domain names comprising only the brand name to the total traffic and/or revenue generated by the entire domain name portfolio. In one embodiment, one or more ranges of such ratios are assigned to qualitative grades to the role of the brand in generating traffic and/or revenue (e.g. 0 or F=no role, 5 or A=critical role). Such ranges could be determined qualitatively by an analyst employed by the brand owner or brand analysis service provider, or quantitatively using a mathematical technique, for example using a proportional, exponential or logarithmic scale.

Where traffic and revenue data are both available, a role of brand index could be calculated separately using each type of data. Traffic-based and revenue based role of brand indexes could additionally be combined to arrive at a combined role of brand index, using any mathematical technique known in the art for example, a weighted average of the two indexes.

Brand earnings and the role of brand index can then be reported to the brand owner. In one embodiment brand earnings and the role of brand index are transmitted to the brand owner, over the network, in a format suitable for that particular brand owner. Such formats could include a formatted report which is emailed to the brand owner, an XML file, or a user interface provided by the brand analysis service provider and accessible, over the network, to the brand owner.

If relevant, the role of brand index can be applied to the brand economic earnings to arrive at branded earnings to isolate a brand's contribution to the earnings attributable to the domain name portfolio. Such branded earnings, if forecast into the future, could be used to calculate a net present value for the brand, or at least a net present value for the brand's ability to generate revenues over the Internet.

Figure 4:
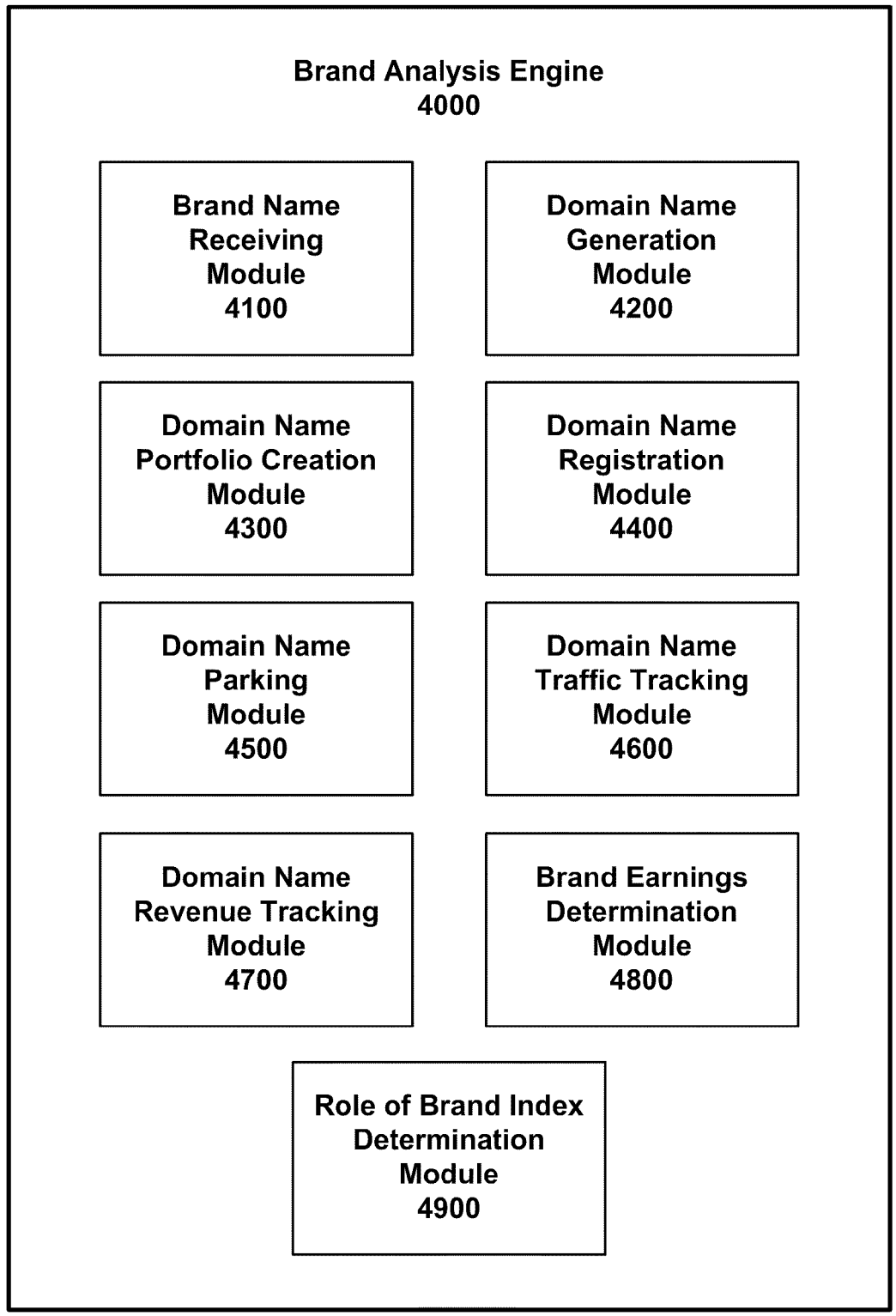
FIG. 4 illustrates one embodiment of a brand analysis engine capable of supporting the process illustrated FIG. 3.

FIG. 4 illustrates one embodiment of a brand analysis engine 4000 capable of supporting the process illustrated FIG. 3. In one embodiment, brand analysis engine 4000 comprises a brand name receiving module 4100, a domain name generation module 4200, a domain name portfolio creation module 4300, a domain name registration module 4400, a domain name parking module 4500, a domain name traffic tracking module 4600, a domain name revenue tracking module 4700, a brand earnings determination module 4800, and a role of brand index determination module 4900

In one embodiment, each of the modules comprises one or more processors programmed to execute software code retrieved from a computer readable storage medium storing software for functions as described below. In one embodiment, the brand analysis engine 4000 could be implemented on one or more brand analysis servers such as the servers 2620 shown in FIG. 2. Such an embodiment is purely illustrative, and other configurations will be readily apparent to those skilled in the art.

In one embodiment, the brand name receiving module 4100 is configured to receive brand names, over a network. The brand name can comprise one or more tokens, each of which is a letter, symbol or word. The brand name could be transmitted by a brand owner to a server directly to a server maintained by a brand analysis service provider, or alternatively, could be communicated to a brand analysis service provider by, for example, regular mail, email, or voice communications. The brand name could then be input to a brand analysis process though a user interface provided by, for example, the brand name receiving module 4100.

In one embodiment, the domain name generation module 4200 is configured to generate a plurality of domain names relating to each brand name received by the brand name receiving module 4100. In one embodiment, the plurality of domain names relating to a given brand includes domain names that are comprised of the brand name only, and domains that comprise the brand name together with qualifying terms that could include generic or descriptive terms describing or categorizing the services rendered, or products offered. The methods employed by the domain name generation module 4200 could include any of the methods for domain name generation described above with respect to step 3200 of FIG. 3.

In one embodiment, the domain name portfolio creation module 4300 is configured to create a domain name portfolio for each of the pluralities of domain names relating to a brand name generated by the domain name generation module 4200. Each of the generated domain names is checked using the WHOIS protocol to determine if the respective domain name is registered. Those domain names that are available for registration and domain names that are registered to the brand owner for the respective brand are selected for inclusion in a domain name portfolio for the respective brand. Domain names that are registered to a third party can be reported to the brand owner.

In one embodiment, the domain name registration module 4400 automatically registers domain names in each of the domain name portfolios created by the domain name portfolio creation module 4300 that are available for registration on behalf of the respective brand owner. In one embodiment, registration forms required for domain name registration can be automatically filled with the required information from information included in a brand owner profile stored on a computer-readable medium accessible to the domain name registration module 4400.

In one embodiment, the domain name parking module 4500 automatically parks domain names in each of the domain name portfolios created by the domain name portfolio creation module 4400 that are not currently associated with an active website with a domain name parking service. In one embodiment, domain names associated with an active website remain associated with that site. In one embodiment, parked domain names are linked to generic landing pages that can include automatically generated content relating to related products and services, and can further include click-through advertisements linked to an advertising service such as the Yahoo! Advertising service or the Google AdSense service.

In one embodiment, the domain name traffic tracking module 4600 tracks traffic, over an analysis period, on websites linked to each of the domain names in domain name portfolios created by the domain name portfolio creation module 4300. Data relating to traffic could include, for example, the number of visitors to websites by day, the number of unique visitors to websites by day, or the number of visitors to a websites that click through on a link or advertisement on the website. Data relating to traffic on websites could be obtained by the domain name traffic tracking module 4600, for example, from a third party service provider, or could be tracked by a process associated with the website (e.g. a web control embedded in a webpage).

In one embodiment, the domain name revenue tracking module 4700 tracks revenue, over an analysis period, on websites linked to each of the domain names in domain name portfolios created by the domain name portfolio creation module 4300. Such revenue could include revenue generated using any technique for monetization of website traffic known in the art. For example, data relating to revenue generated by websites could include online sales of products associated with the brand name facilitated by the website (e.g. a retailer's online store). Data relating to revenue generated by websites could also include pay-per-click revenue generated by advertisements and links to third-party websites that are displayed on the website. Such data could be retrieved by the domain name revenue tracking module 4700, for example, from a third party service provider (such as Yahoo! Advertising or Google AdSense), or could be tracked by a process associated with the website (e.g. a server-based process that tracks online sales).

In one embodiment, the brand earnings determination module 4800 calculates brand earnings for each domain name portfolio tracked by the domain name revenue tracking module 4700 using the data relating to revenue collected by that module over the analysis period. The brand earnings determination module 4800 could additionally forecast future earnings using any forecasting technique known in the art. The brand earnings determination module 4800 could additionally subtract operating costs related to websites associated with a given domain name portfolio from the brand earnings for the respective brand name portfolio to calculate the branded profit for the respective portfolio. The brand earnings determination module 4800 could additionally apply a charge to the branded profit for a given domain name portfolio for capital employed in creating, hosting and maintaining the websites in order to calculate the brand economic earnings for the respective portfolio.

In one embodiment, the role of brand index determination module 4900 determines the role of brand index for each domain name portfolio tracked by the domain name traffic tracking module 4600 and/or the domain name revenue tracking module 4700 using data relating to traffic on and/or data relating to revenue generated by domains in the respective domain name portfolio. In one embodiment, the role of brand index for a given domain name portfolio is determined using the ratio of traffic and/or revenue generated by domain names comprising only the respective brand name to the total traffic and/or revenue generated by the all domain names in the respective domain name portfolio. Where traffic and revenue data are both available, a role of brand index could be calculated separately using each type of data. Traffic-based and revenue based role of brand indexes could additionally be combined to arrive at a combined role of brand index, using any mathematical technique known in the art for example, a weighted average of the two indexes.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

I claim:

1. A method comprising the steps of:
    receiving, over a network, a brand name, wherein the brand name comprises at least one token;
    generating, using at least one computing device, a plurality of domain names, wherein the plurality of domain names comprises at least one brand domain name comprising the brand name and a top level domain name, and wherein the plurality of domain names further comprises at least one qualified brand domain name comprising the brand name, at least one qualifying term, and the top level domain name;
    creating, using the at least one computing device, a domain name portfolio, wherein each of the plurality of domain names is checked using the WHOIS protocol to determine if the respective domain name is registered, wherein domain names that are not registered and domain names that are registered to an owner of the brand are inserted into the domain name portfolio;
    registering, using the at least one computing device, each of the domain names in the domain name portfolio that is not registered to the brand owner, whereby each of the domain names in the domain name portfolio is registered to the brand owner;
    parking, using the at least one computing device, each of the domain names in the domain name portfolio with a domain name parking service;
    tracking, using the at least one computing device, network traffic, for each of the domain names in the domain name portfolio over an analysis period; and
    determining, using the at least one computing device, a first role of brand index, wherein the role of brand index is determined using the ratio of network traffic for the at least one brand domain name to a total of the network traffic for all domain names in the domain name portfolio.

2. The method of claim 1 comprising the additional steps of:
    tracking, using the at least one computing device, revenue generated by websites linked to each of the domain names in the domain name portfolio over the analysis period; and
    calculating, using the at least one computing device, brand earnings using the revenue generated by websites linked to each of the domain names in the domain name portfolio over the analysis period.

3. The method of claim 2 further comprising the additional step of:
    calculating, using the at least one computing device, branded operating profit by subtracting a charge for operating costs from the brand earnings.

4. The method of claim 3 further comprising the additional step of:
    calculating, using the at least one computing device, brand economic earnings by applying a charge to the branded profit for capital employed in creating, hosting and maintaining the domain name portfolio.

5. The method of claim 4 further comprising the additional step of:
    calculating, using the at least one computing device, brand earnings, wherein by applying the first role of brand index to the brand economic earnings.

6. The method of claim 2 further comprising the additional step of:
    determining, using the at least one computing device, a second role of brand index, wherein the second role of brand index is determined using the ratio of brand earnings for the at least one brand domain name to a total of the network brand earnings for all domain names in the domain name portfolio.

7. The method of claim 1 wherein the at least one qualifying term is received over the network.

8. The method of claim 1 wherein the at least one qualifying term is selected using a method comprising the steps:
    submitting, over the network, using the computing device, a query to an Internet search engine, wherein the query comprises at least the brand name;
    receiving, over the network, a search result comprising a plurality of search result entries; and
    selecting, using the computing device, the at least one qualifying term, from the search result wherein the at least one qualifying term is closely associated with the brand name in at least one of the plurality of search result entries.

9. The method of claim 4 wherein the search result comprises at least one search result domain name that comprises the brand name, wherein the at least one search result domain name is included in the domain name portfolio.

10. The method of claim 1 wherein the top level domain name is received over the network.

11. The method of claim 1 wherein the top level domain name is selected using a method comprising the steps:
    submitting, over the network, using the computing device, a query to an Internet search engine, wherein the query comprises at least the brand name;
    receiving, over the network, a search result comprising a plurality of search result entries; and selecting, using the computing device, the top level domain name, wherein the top level domain is a top level domain name most frequently associated with websites in the search result that reference the brand name.

12. The method of claim 1 wherein if at least one of the a plurality of domain names is registered to a party that is not affiliated with the brand owner, the WHOIS information for the party is transmitted, over the network, to the brand owner.

13. The method of claim 1 wherein parked domain names are linked to generic landing pages that comprises automatically generated content relating to related products and services.

14. The method of claim 1 wherein the generic landing pages further comprise click-through advertisements linked to an advertising service.

15. A system comprising:
a brand name receiving module comprising one or more processors programmed to execute software code retrieved from a computer readable storage medium storing software for receiving, over a network, brand names, wherein each brand name comprises at least one token;
a domain name generation module comprising one or more processors programmed to execute software code retrieved from a computer readable storage medium storing software for generating, for each brand name received by the brand name receiving module, a plurality of domain names, wherein the plurality of domain names comprises at least one brand domain name comprising the respective brand name and a top level domain name, and wherein the respective plurality of domain names further comprises at least one qualified brand domain name comprising the respective brand name, at least one qualifying term, and the top level domain name;
a domain name portfolio creation module comprising one or more processors programmed to execute software code retrieved from a computer readable storage medium storing software for creating, for each plurality of domain names generated by the domain name generation module, a domain name portfolio, wherein each of the plurality of domain names is checked using the WHOIS protocol to determine if the respective domain name is registered, wherein domain names that are not registered and domain names that are registered to an owner of the respective brand are inserted into the domain name portfolio;
a domain name registration module comprising one or more processors programmed to execute software code retrieved from a computer readable storage medium storing software for registering each of the domain names in the each of the domain name portfolios created by the domain name portfolio creation module that is not registered to the respective brand owner, whereby each of the domain names in the respective domain name portfolio is registered to the respective brand owner;
a domain name parking module comprising one or more processors programmed to execute software code retrieved from a computer readable storage medium storing software for parking each of the domain names in each of the domain name portfolios created by the domain name portfolio creation module with a domain name parking service;
a domain name traffic tracking module comprising one or more processors programmed to execute software code retrieved from a computer readable storage medium storing software for tracking network traffic, for each of the domain names in the each of the domain name portfolios created by the domain name portfolio creation module over an analysis period; and
a role of brand index determination module comprising one or more processors programmed to execute software code retrieved from a computer readable storage medium storing software for determining a first role of brand index for each of the domain name portfolios created by the domain name portfolio creation module over an analysis period, wherein the respective role of brand index is determined using the ratio of network traffic for the respective at least one brand domain name to a total of the network traffic for all domain names in the respective domain name portfolio.

16. The system of claim 15 additionally comprising:
a domain name revenue tracking module comprising one or more processors programmed to execute software code retrieved from a computer readable storage medium storing software for tracking, for each of the domain name portfolios created by the domain name portfolio creation module, revenue generated by websites linked to each of the respective domain names in the respective domain name portfolios over the analysis period; and
a brand earnings determination module comprising one or more processors programmed to execute software code retrieved from a computer readable storage medium storing software for calculating, for each of the domain name portfolios tracked by the domain name revenue tracking module, brand earnings using the revenue generated by websites linked to each of the respective domain names in the respective domain name portfolio over the analysis period.

17. The system of claim 16 wherein the brand earnings determination module additionally calculates branded operating profit by subtracting a charge for operating costs from the brand earnings.

18. The system of claim 17 wherein the brand earnings determination module additionally calculates brand economic earnings by applying a charge to the branded profit for capital employed in creating, hosting and maintaining the domain name portfolio.

19. The system of claim 18 wherein the brand earnings determination module additionally calculates brand earnings, wherein by applying the first role of brand index to the brand economic earnings.

20. A computer readable storage media for tangibly storing thereon computer readable instructions, that when executed by a processor, perform a method comprising the steps of:
receiving, over a network, a brand name, wherein the brand name comprises at least one token;
generating, using at least one computing device, a plurality of domain names, wherein the plurality of domain names comprises at least one brand domain name comprising the brand name and a top level domain name, and wherein the plurality of domain names further comprises at least one qualified brand domain name comprising the brand name, at least one qualifying term, and the top level domain name;
creating, using the at least one computing device, a domain name portfolio, wherein each of the plurality of domain names is checked using the WHOIS protocol to determine if the respective domain name is registered, wherein domain names that are not registered and domain names that are registered to a brand owner are inserted into the domain name portfolio;
registering, using the at least one computing device, each of the domain names in the domain name portfolio that is not registered to the brand owner, whereby each of the domain names in the domain name portfolio is registered to the brand owner;

parking, using the at least one computing device, each of the domain names in the domain name portfolio with a domain name parking service;

tracking, using the at least one computing device, network traffic, for each of the domain names in the domain name portfolio over an analysis period; and determining using the at least one computing device, a first role of brand index, wherein the role of brand index is determined using the ratio of network traffic for the at least one brand domain name to a total of the network traffic for all domain names in the domain name portfolio.

21. The computer readable storage media of claim 20 comprising the additional steps of:

tracking, using the at least one computing device, revenue generated by websites linked to each of the domain names in the domain name portfolio over the analysis period; and calculating, using the at least one computing device, brand earnings using the revenue generated by websites linked to each of the domain names in the domain name portfolio over the analysis period.

22. The computer readable storage media of claim 21 further comprising the additional step of:

calculating, using the at least one computing device, branded operating profit by subtracting a charge for operating costs from the brand earnings.

23. The method of claim 22 further comprising the additional step of:

calculating, using the at least one computing device, brand economic earnings by applying a charge to the branded profit for capital employed in creating, hosting and maintaining the domain name portfolio.

24. The computer readable storage media of claim 23 further comprising the additional step of:

calculating, using the at least one computing device, brand earnings, wherein by applying the first role of brand index to the brand economic earnings.

25. The computer readable storage media of claim 21 further comprising the additional step of:

determining, using the at least one computing device, a second role of brand index, wherein the second role of brand index is determined using the ratio of brand earnings for the at least one brand domain name to a total of the brand earnings for all domain names in the domain name portfolio.

26. The computer readable storage media of claim 20 wherein the at least one qualifying term is selected using a method comprising the steps:

submitting, over the network, using the computing device, a query to an Internet search engine, wherein the query comprises at least the brand name;

receiving, over the network, a search result comprising a plurality of search result entries; and selecting, using the computing device, the at least one qualifying term, wherein the at least one qualifying term is closely associated with the brand name in at least one of the plurality of search result entries.

27. The computer readable storage media of claim 20 wherein the top level domain name is selected using a method comprising the steps:

submitting, over the network, using the computing device, a query to an Internet search engine, wherein the query comprises at least the brand name;

receiving, over the network, a search result comprising a plurality of search result entries; and selecting, using the computing device, the top level domain name, wherein the top level domain is a top level domain name most frequently associated with websites in the search result that reference the brand name.

* * * * *